United States Patent
Chaw et al.

(10) Patent No.: US 7,196,872 B2
(45) Date of Patent: Mar. 27, 2007

(54) SLIDERS BONDED BY A DEBONDABLE ENCAPSULANT COMPRISING DIFFERENT POLYMERS FORMED VIA IN SITU POLYMERIZATION

(75) Inventors: Michael W. Chaw, San Jose, CA (US); Dan J. Dawson, San Jose, CA (US); Craig J. Hawker, Los Gatos, CA (US); James L. Hedrick, Pleasanton, CA (US); Wesley L. Hillman, Morgan Hill, CA (US); Teddie P. Magbitang, San Jose, CA (US); Dennis R. McKean, Milpitas, CA (US); Robert D. Miller, San Jose, CA (US); Willi Volksen, San Jose, CA (US)

(73) Assignee: Hitachi Global Storage Netherlands, B.V., Amsterdam (NL)

( * ) Notice: Subject to any disclaimer, the term of this patent is extended or adjusted under 35 U.S.C. 154(b) by 413 days.

(21) Appl. No.: 10/835,845

(22) Filed: Apr. 29, 2004

(65) Prior Publication Data

US 2005/0243469 A1 Nov. 3, 2005

(51) Int. Cl.
*G11B 21/20* (2006.01)
*G01B 5/60* (2006.01)
*B32B 27/04* (2006.01)
*B44C 1/22* (2006.01)
*B29C 63/00* (2006.01)

(52) U.S. Cl. ............... 360/235.1; 360/234.3; 216/36; 29/603.17; 29/603.07; 156/344

(58) Field of Classification Search ............. 29/603.17, 29/603.07, 603.12; 216/36, 22, 33, 41; 156/344, 156/325, 247, 60; 438/458; 360/235.1, 360/234.3
See application file for complete search history.

(56) References Cited

U.S. PATENT DOCUMENTS

| 3,971,834 | A |   | 7/1976 | Uzelmeier et al. |
|---|---|---|---|---|
| 4,051,195 | A |   | 9/1977 | McWhorter |
| 4,547,562 | A |   | 10/1985 | Nichols |
| 4,675,374 | A |   | 6/1987 | Nichols |
| 4,742,147 | A |   | 5/1988 | Nichols |
| 5,516,430 | A | * | 5/1996 | Hussinger ............... 216/36 |
| 5,722,156 | A | * | 3/1998 | Balfrey et al. ........... 29/603.08 |

(Continued)

FOREIGN PATENT DOCUMENTS

JP 56059819 5/1981

*Primary Examiner*—William J Klimowicz
(74) *Attorney, Agent, or Firm*—Mintz, Levin, Cohn, Ferris, Glovsky and Popeo P.C.

(57) ABSTRACT

A slider assembly is provided comprising a plurality of sliders bonded by a debondable solid encapsulant comprised of different first and second polymers The solid encapsulant is comprised of a polymer prepared by polymerizing an encapsulant fluid comprising a homogeneous mixture of first and second constituents. The first constituent is comprised of a first monomer suitable for in situ polymerization to form the first polymer. The second constituent is comprised of the second polymer or a second monomer suitable for in situ polymerization to form the second polymer. The first constituent does not substantially react with the second constituent. Each slider has a surface that is free from the encapsulant. The encapsulant-free surfaces are coplanar to each other. Also provided are methods for forming the assembly and methods for patterning a slider surface using the encapsulant.

41 Claims, 6 Drawing Sheets

U.S. PATENT DOCUMENTS

| | | |
|---|---|---|
| 5,932,113 A | 8/1999 | Kurdi et al. |
| 6,106,736 A | 8/2000 | LeVan et al. |
| 6,235,850 B1 | 5/2001 | Perez et al. |
| 7,017,257 B2 * | 3/2006 | Lelong .................... 29/603.18 |
| 7,064,929 B2 * | 6/2006 | McKean et al. ......... 360/235.1 |
| 7,077,970 B2 * | 7/2006 | Buchan et al. ................ 216/22 |
| 2004/0264050 A1 * | 12/2004 | Brock et al. ............. 360/234.3 |
| 2004/0265531 A1 * | 12/2004 | McKean et al. ........... 428/41.9 |
| 2004/0266186 A1 * | 12/2004 | Brock et al. ................. 438/689 |
| 2005/0067373 A1 * | 3/2005 | Brock et al. ................... 216/22 |
| 2005/0126706 A1 * | 6/2005 | Bunch et al. ............... 156/325 |
| 2005/0191418 A1 * | 9/2005 | Bietsch et al. .............. 427/256 |
| 2005/0191582 A1 * | 9/2005 | Bietsch et al. .............. 430/311 |

\* cited by examiner

SLIDERS BONDED BY A DEBONDABLE ENCAPSULANT COMPRISING DIFFERENT POLYMERS FORMED VIA IN SITU POLYMERIZATION

TECHNICAL FIELD

The invention relates generally to the bonding of one or more sliders in a polymeric encapsulant. More particularly, the invention relates to planarized slider assemblies bonded by a debondable polymeric encapsulant comprised of different polymers formed via in situ polymerization of an encapsulant fluid. The invention also relates to methods that use such encapsulants in conjunction with resists to produce magnetic head sliders having patterned air-bearing surfaces.

BACKGROUND

A magnetic storage system typically includes one or more magnetic recording disks having surfaces from which data may be read and to which data may be written by a read/write transducer or "head." The transducer is supported by an air-bearing slider that has a top surface attached to an actuator assembly via a suspension, and a bottom surface having an air-bearing design of a desired configuration to provide favorable flying height characteristics. As a disk begins to rotate, air enters the leading edge of the slider and flows in the direction of the trailing edge of the slider. The flow of air generates a positive pressure on the air-bearing surface of the slider to lift the slider above the recording surface. As the spindle motor reaches the operating RPM, the slider is maintained at a nominal flying height over the recording surface by a cushion of air. Then, as the spindle motor spins down, the flying height of the slider drops.

The manner in which a slider is manufactured can affect flying height. Preferably, variations in the physical characteristics of the slider, e.g., those due to manufacturing tolerances, should not substantially alter the flying height of the slider. If this result is not achieved, the slider's nominal flying height must be increased to compensate for variations between sliders.

A number of technologies may be employed to pattern such slider surfaces. For example, mechanical processes such as cutting or abrading have been proposed to remove material from a slider surface. Similarly, non-mechanical processes such as laser ablation, in which high intensity light is used to evaporate material from sliders, have also been proposed. Alternatively, material may be added to slider surfaces to alter their configuration to provide favorable flying height characteristics. In some instances, these technologies have been used in conjunction with photolithographic and other semiconductor processing techniques. In addition, these technologies may be adapted to pattern a plurality of air-bearing slider surfaces simultaneously and/or systematically.

Thus, several approaches have been developed to facilitate the handling of a plurality of sliders for simultaneous and/or systematic patterning of their air-bearing surfaces. For example, U.S. Pat. No. 5,932,113 to Kurdi et al. describes a method for preparing the air-bearing surface of a slider for etch patterning. The method involves applying first and second thin films comprising, respectively, first and second air-bearing surfaces, to a carrier in a manner such that the first and second thin film are separated by a recess. An adhesive film is applied over the first and second thin films adjacent to the first and second air-bearing surfaces. Then, a curable acrylate adhesive fluid is deposited in the recess and held therein by the adhesive film. Once the fluid is cured, the adhesive film is removed. The resulting slider assembly may then be patterned by etching. For example, the first and second air-bearing surfaces may be coated with an etch mask, which is then developed to allow for the patterning of the first and second air-bearing surfaces. U.S. Pat. No. 6,106,736 to LeVan et al. describes a similar method of preparing an air-bearing surface of a slider for etch patterning, except that a heated wax is employed in place of the curable acrylate adhesive.

In sum, the above-described approaches employ an encapsulant to fill the gaps between sliders to protect the edges of the sliders during patterning. However, these encapsulants suffer from a number of disadvantages. For example, the curable encapsulants described in Kurdi et al. and the waxes described in LeVan et al. often exhibit unfavorable bonding and/or debonding performance. In particular, cured epoxy materials, e.g., pure thermosetting epoxy resins, can be removed from sliders only with great difficulty and often leave significant material residue on the slider surfaces. In addition, the prior art encapsulants suffer from incompatibility with solvents that are used with the photolithographic techniques for patterning air-bearing surfaces. That is, the prior art encapsulants are mechanically unstable and are subject to solvation when exposed to fluids used in photolithographic techniques.

Recently, advances have been made with respect to slider assemblies comprising a plurality of sliders bonded by a solid debondable polymeric encapsulant. For example, silicon-containing polymeric encapsultants for forming slider assemblies are described in U.S. patent application Ser. No. 10/611,418, entitled "Sliders Bonded by a Debondable Silicon-Based Encapsulant," inventors McKean et al., filed on Jun. 30, 2003. Additional encapsulant technologies are described in U.S. patent application Ser. No. 10/611,673, entitled "Sliders Bonded by a Debondable Encapsulant Containing Styrene and Butadiene Polymers," inventors Miller et al. filed on Jun. 30, 2003, in U.S. patent application Ser. No. 10/611,317, entitled "Sliders Bonded by a Debondable Encapsulant Containing Styrene and Acrylate Polymers," inventors McKean et al., filed on Jun. 30, 2003, U.S. patent application Ser. No. 10/672,011, entitled "Sliders Bonded by a Debondable Non-Stoichiometric Encapsulant," inventors Buchan et al. filed on Sep. 25, 2003, and U.S. patent application Ser. No. 10/673,052, entitled "A Stable Encapsulant Fluid Capable of Undergoing Reversible Diels-Alder Polymerization," inventors Brock et al. filed on Sep. 26, 2003.

Nevertheless, there exist opportunities in the art to provide alternatives to known encapsulants for forming slider assemblies. In particular, it has been discovered that an improved polymeric encapsulant comprised of a plurality of polymers may be prepared by in situ polymerization of an encapsulant fluid containing a homogeneous mixture of constituents. Such encapsulants may for an interpenetrating polymeric network that allows for improved debondability.

SUMMARY OF THE INVENTION

Accordingly, one aspect of the invention relates to a slider assembly formed using a debondable solid encapsulant. Another aspect of the invention pertains to a method for forming such slider assemblies.

Yet another aspect of the invention provides methods for using a debondable solid encapsulant to pattern an air-bearing surface of a slider.

Additional aspects, advantages and novel features of the invention will be set forth in part in the description that follows, and in part will become apparent to those skilled in the art upon examination of the following, or may be learned by practice of the invention through routine experimentation.

In a first embodiment, the invention provides a slider assembly comprising a plurality of sliders bonded by a solid debondable encapsulant. Each slider has an encapsulant-free surface, and the encapsulant-free surfaces are coplanar to each other. The encapsulant is comprised of different first and second polymers and is formed via in situ polymerization of an encapsulant fluid. The encapsulant fluid is comprised of a homogeneous mixture of first and second constituents. The first constituent is comprised of a first monomer suitable for in situ polymerization to form the first polymer. The second constituent is comprised of the second polymer or a second monomer suitable for in situ polymerization to form the second polymer. The first constituent does not substantially react with the second constituent.

A variety of chemistries may be used. For example, the first constituent is comprised of an amine, e.g., a tetraamine, and an epoxide, e.g., a diepoxide, optionally in a stoichiometric ratio. In addition, the first monomer may be comprised of an acrylate. In some instances, the first polymer is a thermosetting polymer and the second polymer is a thermoplastic polymer. When the second constituent is comprised of the second monomer suitable for in situ polymerization, the first and second polymers may be polymerized via different mechanisms. For example, the first polymer may be polymerized via condensation, e.g., reaction between an amine and an epoxide, and the second polymer may be polymerized via addition, e.g., addition polymerization of an acrylate.

In addition, different types of polymeric structures may be employed. For example, the first polymer may be comprised of a linear polymer, a branch polymer, or a network polymer. The second polymer may be comprised of a linear polymer. In some embodiments, the encapsulant is transparent.

Typically, the slider assembly is used as an intermediate to pattern air-bearing slider surfaces. Thus, the assembly may have a contiguous planar surface comprised of at least one encapsulant region and containing the coplanar slider surfaces. In addition, the sliders may be arranged in an array, e.g., a rectilinear array, such that they do not contact each other. Often, the coplanar surfaces of the sliders are each an air-bearing surface in contact with a substrate. Such a substrate may be comprised of a laminate of a flexible tape and an adhesive. For example, the adhesive may be a pressure sensitive adhesive that preferentially adheres to the tape over the air-bearing surfaces. For ease in handling, a carrier may be attached to the encapsulant, at least one slider, or both, without covering any of the coplanar slider surfaces.

In another embodiment, the invention provides a method for forming a slider assembly. A plurality of sliders, each having a surface, is arranged such that the surfaces are coplanar to each other. The encapsulant fluid as described above is dispensed to bond the sliders without contacting the coplanar slider surfaces. Once dispensed, the encapsulant fluid is polymerized in situ to form a solid debondable polymeric encapsulant comprised of the first and second polymers.

When both the first and second constituents are suitable for in situ polymerization, polymerization may take place simultaneously. Typically, polymerization is carried out in a temperature range of about 60° C. to about 150° C. Optionally, the polymerization temperature range is of about 80° C. to about 120° C.

Preferably, the encapsulant fluid dispensed in step (b) does not contain any solvent. To ensure proper gap filling capabilities, the fluid mixture may have an initial viscosity of no more than about 800 centistokes. Optionally, the initial viscosity is no more than about 500 centistokes.

In a further embodiment, the invention provides a method for patterning an air-bearing surface of a slider. A slider is provided such that a portion of the slider other than an air-bearing surface thereof is encapsulated in a debondable solid encapsulant as described above. A resist layer is applied on an air-bearing surface of a slider, and a portion of the resist layer is removed to uncover a portion of the air-bearing surface in a patternwise manner. Material is adding material and/or removing from the uncovered portion of the air-bearing surface. Notably, the encapsulant is mechanically stable upon exposure to any fluid employed when the resist layer is applied, when the resist layer is removed, and/or when material is added to and/or removed from the air-bearing surface. As a result, the air-bearing surface of the slider is patterned. Typically, the resist layer is exposed to photons in a patternwise manner before a portion thereof is removed. Afterwards, the encapsulant may be removed via solvation by a solvent not found in the resist layer.

In a first embodiment, the present invention provides a slider assembly comprising a plurality of sliders bonded by a solid encapsulant. The encapsulant is comprised of a polymer prepared by polymerizing, e.g., via in situ polymerization, a mixture of first and second monomers in a nonstoichiometric ratio effective to render the encapsulant debondable. Each slider has a surface that is free from the encapsulant, and the encapsulant-free surfaces are coplanar to each other.

Typically, the slider assembly has a contiguous planar surface comprised of at least one encapsulant region and containing the coplanar slider surfaces. In addition, the sliders may be arranged in an array, e.g., rectilinear array, such that the sliders do not contact each other. The coplanar surfaces of the sliders may be air-bearing surfaces.

Any of a number of monomers may be used in the practice of the invention as long as the polymer is prepared from a stoichiometric excess of the one of the monomers to the other monomer. For example, the polymer may be prepared with an excess of an amine-containing monomer, or an excess of an epoxide-containing monomer. Typically, at least one of the monomers has a structure suitable for forming a linear polymer, a branched polymer, or a polymeric network.

In another embodiment, the invention provides a method for forming a slider assembly. The method involves arrange a plurality of sliders each having a surface such that the surfaces are coplanar to each other. A fluid mixture of first and second monomers in a nonstoichiometric ratio is dispensed in a manner effective to bond the sliders without contacting the coplanar slider surfaces, and the first and second monomers are polymerized to form a polymeric debondable solid encapsulant.

In a related embodiment, the invention provides a method for forming a slider assembly that involves first selecting first and second monomers such that polymerization thereof in a stoichiometric ratio forms a nondebondable solid encapsulant. Then a fluid mixture of the first and second monomers is produced in a nonstoichiometric ratio. The mixture is dispensed in a manner effective to bond a plurality of sliders. Once dispensed, the first and second monomers are polymerized to form a debondable solid encapsulant.

Typically, sliders are arranged on a laminate of a flexible tape and an adhesive such that the slider surfaces contact the adhesive. In such a case, the adhesive is preferably resistant and optimally impervious to solvation by the fluid mixture. To facilitate intimate bonding between the sliders, the fluid mixture may have an initial viscosity of no more than about 800 centistokes.

In a further embodiment, the invention provides a method for patterning an air-bearing surface of a slider. A resist layer is applied on an air-bearing surface of a slider such that at least a portion of the slider other than the air-bearing surface is encapsulated in a debondable solid encapsulant. The encapsulant is comprised of a polymer prepared by polymerizing a mixture of first and second monomers in a nonstoichiometric ratio effective to render the encapsulant debondable. A portion of the resist layer is removed to uncover a portion of the air-bearing surface in a patternwise manner. Material may be added to, or more typically, removed from the uncovered portion of the air-bearing surface. As a result, the air-bearing surface of the slider is patterned. The encapsulant is mechanically stable upon exposure to any fluid employed to effect patterning of the air-bearing surface.

BRIEF DESCRIPTION OF THE FIGURES

FIGS. 2A and 2B depict the arrangement of sliders in a rectilinear array on a substrate in the form of a tape having a pressure-sensitive adhesive coated on an upper surface thereof in top view. FIG. 2B depicts the arrangement of sliders of FIG. 2A in cross-sectional view along dotted line A. FIGS. 2C and 2D depict the formation of an encapsulated array in top and cross-sectional views, respectively. FIGS. 2E and 2F depict the encapsulated array of FIGS. 2C and 2D attached to a carrier and having the tape removed in top and cross-sectional views, respectively.

FIG. 3A depicts in cross-sectional view the application of a photoresist layer on the air-bearing surface of the slider assembly. FIG. 3B depicts in cross-sectional view the patternwise exposure of the photoresist layer. FIG. 3C depicts in cross-sectional view the removal of the resist layer according to the pattern formed in FIG. 3B. FIG. 3D depicts in cross-sectional view the removal of material from the exposed slider surfaces. FIG. 3E depicts in top view debonded sliders having patterned air-bearing surfaces.

DETAILED DESCRIPTION OF THE INVENTION

Definitions and Overview

Figure 1:
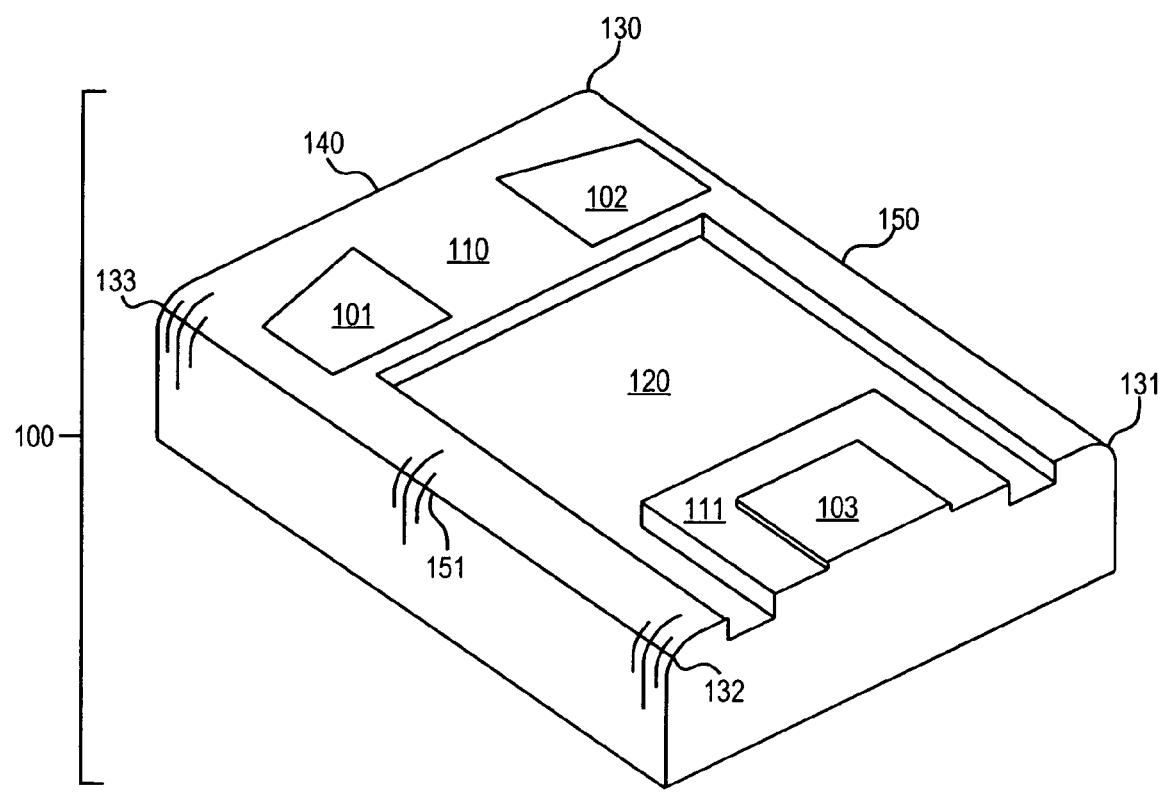
FIG. 1 schematically illustrates a prior art slider having rounded corners and edges.

Before describing the present invention in detail, it is to be understood that this invention is not limited to processing conditions, manufacturing equipment, or the like, as such may vary. It is also to be understood that the terminology used herein is for describing particular embodiments only and is not intended to be limiting.

It must be noted that, as used in the specification and the appended claims, the singular forms "a," "an" and "the" include plural referents unless the context clearly dictates otherwise. Thus, for example, reference to "a resist layer" includes a single resist layer as well as a plurality of resist layers, reference to "a slider" includes a single slider as well as a plurality of sliders, and the like.

In describing and claiming the present invention, the following terminology is used in accordance with the definitions set out below.

The term "array" as used herein refers to a two-dimensional arrangement of items such as an arrangement of sliders. Arrays are generally comprised of regular, ordered items as in, for example, a rectilinear grid, parallel stripes, spirals, and the like, but non-ordered arrays may be advantageously used as well. In particular, the term "rectilinear array" as used herein refers to an array that has rows and columns of items wherein the rows and columns typically, but not necessarily, intersect each other at a ninety-degree angle. An array is distinguished from the more general term "pattern" in that patterns do not necessarily contain regular and ordered features.

The term "bond" is used herein in its ordinary sense and means to join securely. Typically, but not necessarily, "bonding" is achieved through adhesive forces. Similarly, the term "debondable" as in "debondable encapsulant" refers to an encapsulant that is susceptible to complete removal from the surfaces of items bonded thereby without damage to the items.

The term "encapsulant" refers to a material suited to bond a plurality of items or to encase one or more items in a confined space. Typically, an "encapsulant" is a solid material formed from an "encapsulant fluid" that has been subjected to conditions effective for solidification to occur. For example, an "encapsulant" may be formed from the polymerization of an "encapsulant fluid" comprising a mixture of first and second monomers.

The term "fluid" is generally used in its ordinary sense and refers to matter that is capable of flow. Typically, but not necessarily, a fluid contains a liquid and optionally a solid or a gas that is minimally, partially, or fully solvated, dispersed, or suspended in the liquid. For example, a fluid may be aqueous or nonaqueous in nature and may contain organic solvents and the like having polymers and/or monomers solvated therein.

"Optional" or "optionally" means that the subsequently described circumstance may or may not occur, so that the description includes instances where the circumstance occurs and instances where it does not.

The term "polymer" is used herein in its conventional sense to refer to a compound having two or more monomer units, and is intended to encompass homopolymers as well as copolymers, including, for example, graft copolymers. The term encompasses polymers of all types and is not limited to linear, branched, cyclic, or crosslinked polymers. Thus, the term "polymerization" refers to processes in which monomers come together to form a polymer. As used herein, the term is meant to encompass "crosslinking" processes in which network polymers may be formed.

The terms "stoichiometry" and "stoichiometric" are used herein in their ordinary sense and refer to the quantitative relationship between reactants and products in a chemical reaction. Thus, the term "nonstoichiometric" as used herein refers to a chemical reaction between a plurality of reactants that takes place with an excess or deficiency of at least one reactant. For example, amine groups will react with an equal number of epoxide groups in a stoichiometric reaction. That is, the stoichiometric ratio of amine groups and epoxide groups for such a reaction is 1. Thus, when the same number of amine groups and epoxide groups is provided for reaction, the reaction that takes place is considered "stoichiometric." It follows, then, when an excess of amine groups or epoxide groups are provided for reaction, the reaction that takes place is considered "non-stoichiometric." Similarly, a reaction that takes place between equal quanitities of a first reactant containing X amine groups and a second reactant containing Y epoxide groups is considered "non-stoichiometric" when X does not equal Y.

The term "solid" is used in its ordinary sense and refers to items that have definite shape and volume.

The term "substantially" as in, for example, the phrase "substantially identical in geometric dimensions" refers to items having dimensions that do not deviate from each other by more than about 10%. Preferably, the difference in the dimensions is no more than 1%. Optimally the difference is no more than 0.1%. Other uses of the term "substantially" involve an analogous definition.

Slider Assembly

Generally, the invention relates to the patterning of an air-bearing surface of a slider, and various embodiments of the invention provide slider assemblies suitable for use in conjunction with such surface patterning processes. In particular, the invention provides an encapsulant fluid comprised of a homogeneous mixture of constituents. The encapsulant fluid is used to forming a debondable encapsulant comprised of a plurality of different polymers to encapsulate one or more sliders. At least one of the constituents is comprised of a monomer suitable for in situ polymerization.

For example, the encapsulant may be formed via concurrent polymerization of a homogeneous mixture of different types of monomers in the same "pot." Each monomer type may undergo a different polymerization chemistry to form different polymers. The chemistries may be selected to occur over the same temperature ranges and not substantially affect each other. In addition, the mixture may exhibit low viscosity to result in a homogeneous, transparent encapsulant with the requisite dimensional tolerances, dimensional stability, and solvent resistance. The encapsulant may be solvated or may undergo debonding via by application of an appropriate solvent.

In order to elucidate the invention fully, FIG. 1 depicts a known slider. As with all figures referenced herein, in which like parts are referenced by like numerals, FIG. 1 is not to scale, and certain dimensions may be exaggerated for clarity of presentation. A slider 100 having a generally rectangular air-bearing surface is depicted in FIG. 1. Located on the air-bearing surface of slider 100 are leading pads 101 and 102 disposed on a first shallow step region 110. Additionally, the slider 100 includes a trailing pad 103 disposed on a second shallow step region 111. The shallow step regions 110 and 111 are approximately the same depth with respect to the air-bearing surface.

The shallow step region 110 extends along the leading edge 140 of slider 100 and has side rails that extend along the side edges 150 and 151 of slider 100. The shallow step regions 110 and 111 provide the positive pressure regions of slider 100. More specifically, the shallow step region 110 pressurizes leading pads 101 and 102 and shallow step region 111 pressurizes trailing pad 103 during operation, to give slider 100 a positive lift. Pressurization mainly occurs at the step transition between the shallow step regions and the air-bearing pads. The negative pressure region 120 is responsible for pulling slider 100 towards the disk surface during operation. During operation, the disk is rotating and the slider is flying above the disk surface. In general, the negative and positive pressure regions of slider 100 are counterbalanced to provide a relatively flat flying height profile.

It should be evident from the slider depicted in FIG. 1 that the steps on the air-bearing surface are patterned with sufficient precision to provide a desired flying height profile. Although the size of the sliders may vary, recent advances in slider processing technology allow for the production of sliders having a rectangular air-bearing surface area on the order of 1 mm$^2$ or less. Accordingly, there is an increasing demand for technologies that effect precise control over the placement and spatial orientation of slider surfaces when the surface is patterned.

To this end, the invention provides a slider assembly comprising a plurality of sliders. The sliders are bonded by a debondable solid encapsulant. Depending on the processing techniques that may be used in conjunction with the assembly, certain bonding materials are particularly suitable for use as encapsulants. Selection criteria for suitable encapsulant are discussed below.

The invention may be employed using sliders composed of any material suitable for use as a slider having appropriate thermal, electrical, magnetic and mechanical properties. Typically, sliders for magnetic heads are made from a hard material having a high modulus of elasticity. Such materials include ceramics such as carbides, nitrides, and oxides. Carbides such as aluminum carbide, silicon carbide, titanium carbide, boron carbide, geranium carbide, tungsten carbide, and mixed-metal carbides (e.g., AlTiC or $Al_2O_3TiC$) are generally preferred but other materials such as titanium oxide, silicon nitride and silicon may be used as well. In addition, it is preferred that the slider is sized to require only minimal material addition or removal in order to pattern the air-bearing surface.

Thus, sliders may be formed by first cutting a monolithic solid member into the plurality of sliders. The monolithic solid member may be grown or prepared in bulk, and depending on desired properties, the material may have a single crystalline, multicrystalline, or amorphous microstructure. Exemplary techniques for forming monolithic materials include Czochralski, float zone and other methods known in the art.

Irrespective of the encapsulant employed to form the slider assembly, each slider of the assembly has a surface that is free from the encapsulant. These surfaces are coplanar to each other and typically represent air-bearing surfaces of the sliders. The coplanar arrangement of the slider surfaces is well suited for use in numerous surface-patterning techniques such as those involving the use of masking technology and/or the employment of photolithographic techniques. In some instances, the slider assembly has a contiguous or a substantially planar surface comprised of at least one encapsulant region and containing the coplanar slider surfaces. Such planar surface contiguity facilitates the deposition of a uniform and/or contiguous film or coating on the coplanar slider surfaces. Thus, any steps that may be present between an encapsulant region and the slider surfaces should be no more than that which would disrupt the deposition of a uniform coating on the coplanar slider surface. Typically, such steps are no more than about 5 micrometers in height to provide a high planarization value.

In some instances, the slider has an additional planar surface opposing the coplanar sliders surfaces. The additional planar surface may or may not be contiguous and may be formed from the encapsulant and/or a slider. Such an additional planar surface may further facilitate ease in the handling of the assembly.

In certain embodiments, the sliders of the assembly are substantially identical in geometric dimensions. In addition, the sliders are typically arranged in an array such that the distance between the sliders is minimized without having the sliders contact each other. Contact among the sliders increases the likelihood of slider damage. Often, rectilinear arrays are chosen to maximize the slider to encapsulant volumetric ratio.

The inventive slider assembly may be used as a convenient means for handling and processing a plurality of sliders. To ensure that the sliders remain immobilized with respect to each other, the encapsulant may be rigid. To provide acceptable rigidity, the glass transition temperature of the encapsulant, $T_g$, is typically high, e.g., at least about 100° C. Encapsulants having a $T_g$ of about 100° C. to about 140° C. are known in the art. In addition or in the alternative, the slider assembly as described above may further include a carrier attached to the encapsulant and/or at least one slider. The carrier is particularly useful when the encapsulant is brittle or otherwise difficult to handle. Usually, the carrier does not cover any of the coplanar slider surfaces.

The encapsulant may be selected for certain properties that will facilitate its use in slider patterning techniques. While specific materials suitable for use as an encapsulant are discussed below, encapsulant materials generally share some common characteristics. As an initial matter, the encapsulant should be able to bond with the sliders in a void-free manner without debonding until after the patterning processes have been completed. Because bonding behavior is often surface dependent, the encapsulant should be selected according to the surface to which bonding is to take place. Particular attention should be paid to factors such as surface composition, morphology, and the like.

In addition, the encapsulant should be able to maintain its mechanical and dimensional stability until debonding is desired. For example, the encapsulant preferably exhibits minimal or no shrinkage and/or swelling until debonding is desired. Furthermore, the encapsulant preferably is readily debondable without damage to the sliders and without leaving any residue on the sliders. For example, the encapsulant may be debonded through washing in a solvent capable of solvating the encapsulant or a component thereof. In addition, or in the alterative, heat may be applied to liquefy, vaporize, and/or discompose the encapsulant.

Thus, it should be evident that the encapsulant should be able to withstand the environmental conditions imposed on the sliders during patterning. For example, some slider patterning techniques require the exposure of sliders to a vacuum. Any outgassing from the encapsulant may compromise the quality of the vacuum. Thus, it is sometimes preferred that the encapsulant does not substantially outgas under vacuum. As another example, slider-patterning techniques may require thermal cycling of the sliders. Accordingly, it is preferred that the encapsulant be mechanically stable for thermal cycling, e.g., from about 20° C. to about 100° C.

Method for Forming a Slider Assembly

The invention also provides a method for forming a slider assembly. The method involves arranging a plurality of sliders each having a surface such that the surfaces are coplanar to each other. An encapsulant fluid is dispensed in a manner effective to bond the sliders without contacting the coplanar slider surfaces. The dispensed encapsulant fluid is subjected to conditions effective for the fluid to form a debondable solid encapsulant comprised of different first and second polymers from the encapsulant fluid. As discussed above, the encapsulant fluid is comprised of a homogeneous mixture of first and second constituents as described above. That is, the first constituent is comprised of a first monomer suitable for in situ polymerization to form the first polymer, and the second constituent is comprised of the second polymer or precursor thereof.

Due to the precision required for forming the slider assembly and the size associated with the sliders, manual slider placement is typically undesirable. Instead, automated and/or robotic means for positioning or arrange the sliders may be preferred. Selection of an appropriate means for positioning or arranging the sliders depends on the speed and accuracy required. In some instances, the sliders may be placed simultaneously. In other instances, the sliders may be successively placed. One of ordinary skill in the art will recognize that positioning means, may be constructed from, for example, motors, levers, pulleys, gears, a combination thereof, or other electromechanical or mechanical means.

In order to maintain the sliders in proper position and spatial orientation to allow for solidification of the encapsulant to occur, a means for immobilizing the sliders may be employed. For example, the sliders may be arranged on a substrate surface and immobilized thereon through mechanical action (e.g., clips, centripetal force), electrostatic attraction, magnetic forces, or other known immobilizing means. In some embodiments, the sliders may be temporarily immobilized on a substrate through the application or use of an adhesive on the substrate surface, e.g., pressure sensitive adhesives such as acrylics, natural rubbers, butyl rubbers, polyvinylethers, silicones, and mixtures thereof. As the performance of pressure adhesives may vary with temperature, an adhesive may be selected to exhibit improved performance at temperatures ranging from about 25° C. to 30° C. The pressure of application may range from about 10 $lbs/cm^2$ to 50 $lbs/cm^2$ and preferably is about 25 $lbs/cm^2$. To deter the adhesive from leaving residue on the slider, the adhesive should preferentially adhere to the substrate over the air-bearing surfaces.

As discussed above, the encapsulant fluid is dispensed in a manner effective to bond the sliders without contacting the coplanar slider surfaces. Thus, when the substrate surface is planar, the air-bearing surfaces of the sliders may be placed in contact with the substrate surface to ensure that the air-bearing surfaces remain coplanar as well as to deter contact with the encapsulant fluid. Any adhesive used should be resistant or impervious to solvation by the encapsulant fluid or a component thereof to deter wicking of the encapsulant fluid via the adhesive to contact the slider surfaces.

The substrate may be comprised of any material compatible with the encapsulant fluid. In addition, the substrate is preferably selected from a material that is softer than the slider to avoid damaging any slider surface that comes into contact therewith. In some instances, a flexible substrate may be used to facilitate its removal. For example, any number of polymeric films may be used such as those derived from monomers including ethylene, propylene, butylene and, homopolymers and copolymers of these olefins; vinyl monomers such as vinyl acetate, vinyl chloride, vinylidene chloride, vinyl fluoride, acrylonitrile, methyl methacrylate and mixtures thereof; of ethylene with portions of one or more unsaturated monomers such as vinyl acetate, acrylic acid and acrylic esters; as well as styrenes, carbonates, esters and urethanes. Polymers capable of withstanding relatively high temperatures, such as polyimide may be a desirable substrate material when the substrate may be exposed to a high temperature. Polyimides are commercially available, e.g., under the tradename Kaptong®, from DuPont (Wilmington, Del.). Thus, it should be apparent that the substrate may be a laminate of a flexible tape and an adhesive, wherein the adhesive is in contact with the air-bearing surfaces. Exemplary adhesive thicknesses may range from about 2 to about 25 micrometers and the tape thickness may range from about 12 to about 150 micrometers.

The adhesive strength of the adhesive film varies from about 50 gm/20 mm up to about 100 gm/20 mm. Commercially available adhesive films include V-8-S from Nitto Denko, which is a polyvinyl chloride based tape having a 10 micrometer thick adhesive layer, a 70 micrometer thick polyvinyl chloride flexible substrate and 100 g/20 mm of adhesion. Another film is the Nitto Denko V-8-T, having the same composition as the V-8-S film with 50 gm/mm of adhesion.

Other useful films include Nitto Denko's BT-150E-EL film having 75 gm/20 mm of adhesion, an ethylene vinyl acetate based tape having a 15 micrometer thick adhesive layer; Lintec's Adwill P-1600 B film, which is a water flushable tape having a base material of polyolefin which is 110 micrometers thick, an adhesive layer of polyacrylate which is 20 micrometers thick and has adhesion of 140 gm/25 mm. In some instances, polyesters such as polyethylene terephthalate may be used as a tape material. For example, substrates comprised of a laminate of a polyethylene terephthalate tape having a thickness of about 37 micrometers and an adhesive layer of about 5 micrometers are available from 3M Corporation (St. Paul, Minn.).

As discussed above, the sliders are typically arranged in a rectilinear array on a planar substrate surface such that the distance between the sliders is minimized without having the sliders contact each other. As a result, gaps or recesses are formed between the rows and columns. The distance between the rows and columns may range from about 50 to about 1000 micrometers and can be as small as about 100 micrometers or less. The depth of the gaps depends upon the thicknesses of the sliders and may range from about 100 to about 300 micrometers. While the encapsulant fluid may be dispensed in any manner effective to bond the sliders without contacting the coplanar slider surfaces, encapsulant fluid should flow in certain ways to form certain embodiments of the slider assembly. For example, in order to form void-free slider assemblies, encapsulant fluid is preferably injected or drawn into the gaps or recesses between the rows and the columns. In addition, to form slider assemblies having a contiguous planar surface comprised of at least one encapsulant region and containing the coplanar slider surfaces, the encapsulant fluid preferably conforms to the slider surfaces and the planar substrate surface to which the fluid comes into contact. Furthermore by bringing the level of encapsulant fluid to the same or higher level as the sliders, an additional planar surface opposing the coplanar sliders surfaces may be formed. Molds and equivalents thereof may be advantageously used to confine encapsulant fluid flow.

The ability of the encapsulant fluid to gap-fill is dependent on a number of factors. One particularly important factor is the viscosity of the encapsulant fluid. Viscosity is a measure of resistance of a fluid to sheer forces and is often roughly inversely proportional to the gap-filling ability of the fluid. Typically, the encapsulant fluid has a low initial viscosity, e.g., less than about 1000 centistokes. Preferably, the initial viscosity is no more than about 800 centistokes. More preferably, the initial viscosity is no more than about 500 centistokes. For certain encapsulant fluids, an initial viscosity of about 20 to about 200 centistokes represents an optimal range for gap-filling ability. For encapsulant fluids that contain a solvent, a higher solvent content tends to correlate with lower viscosity. In some instances, an encapsulant fluid containing a polymer dissolved in a solvent exhibits a preferred viscosity at a solvent content of 30 wt % to about 50 wt %. An optimal viscosity may sometimes be found when the solvent is present in a range of about 40 wt % to about 45 wt % of the encapsulation fluid.

Surface forces may also play a role in determining the ability of the encapsulant fluid to gap-fill. In general, the ability of an encapsulant fluid to fill a gap will depend, in part, on the affinity of the surface of the gap to the encapsulant fluid. Thus, proper selection of the encapsulant fluid according to the surface properties of the substrate and/or the sliders may enhance gap filling via capillary action.

Once proper distribution of the encapsulant fluid is achieved, the dispensed encapsulant fluid is subjected to conditions effective for the fluid to form a debondable solid encapsulant from the encapsulant fluid. Depending on the encapsulant used, solidification may take place via a number of different mechanisms. For example, the in situ polymerization reaction may be photoinitiated. In addition, when the encapsulation fluid contains a polymer dissolved in a solvent, formation of a solid encapsulant may involve removing the solvent. This may be achieved by subjecting the encapsulation fluid to heat or reduced pressure. Nevertheless, solventless encapsulant fluids are generally preferred over encapsulant fluids.

In some instances, a combination of mechanisms may be employed. For example, a slider assembly may be formed in the manner as discussed above wherein the encapsulation fluid is comprised of a polymerizable and/or crosslinkable monomer for forming the first polymer, a second polymer, and a solvent. Once dispensed, the solvent may be evaporated to form a debondable solid encapsulant comprising the first and second polymers, wherein the first polymer is prepared via in situ polymerization.

An example of the above-described method for forming the assembly is illustrated in FIG. 2. FIGS. 2A and 2B depict the placement of sliders 10 in a four-by-four rectilinear array on a tape 12 having a substantially planar upper surface 14. The upper surface 14 of the tape has a coating of a pressure-sensitive adhesive 16 coated on an upper surface thereof. Each slider has an air-bearing surface 18 and an opposing back surface 20. The air-bearing surfaces 18 are placed facing downward to face the upper surface 14 of the tape and to contact the pressure sensitive adhesive 16.

Also provided is a rectangular frame 21 in contact with the pressure sensitive adhesive 16. Together with the frame 21, the tape 12 serves as a mold or container to confine the encapsulant fluid dispensed thereon.

Figure 2A:
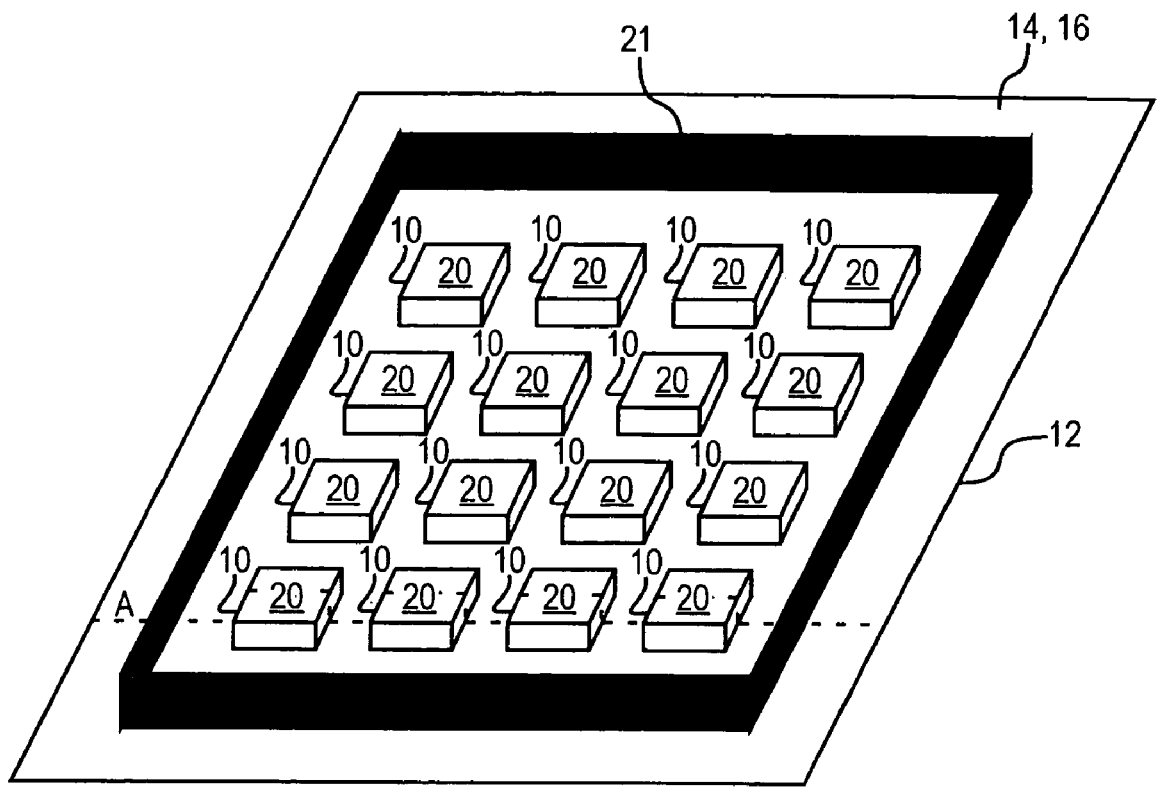
FIGS. 2A–2F, collectively referred to as FIG. 2, depict an example of the inventive slider assembly as well as a method for forming the assembly.
Figure 2B:
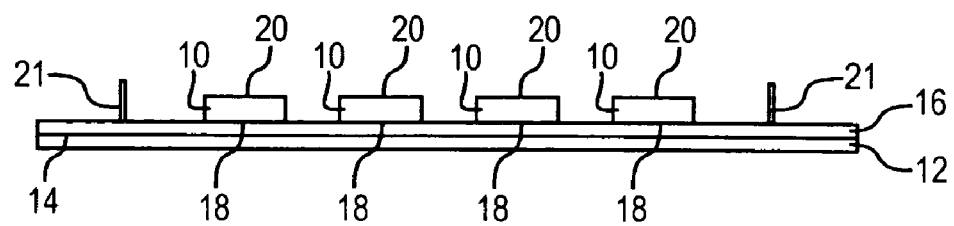
Figure 2C:
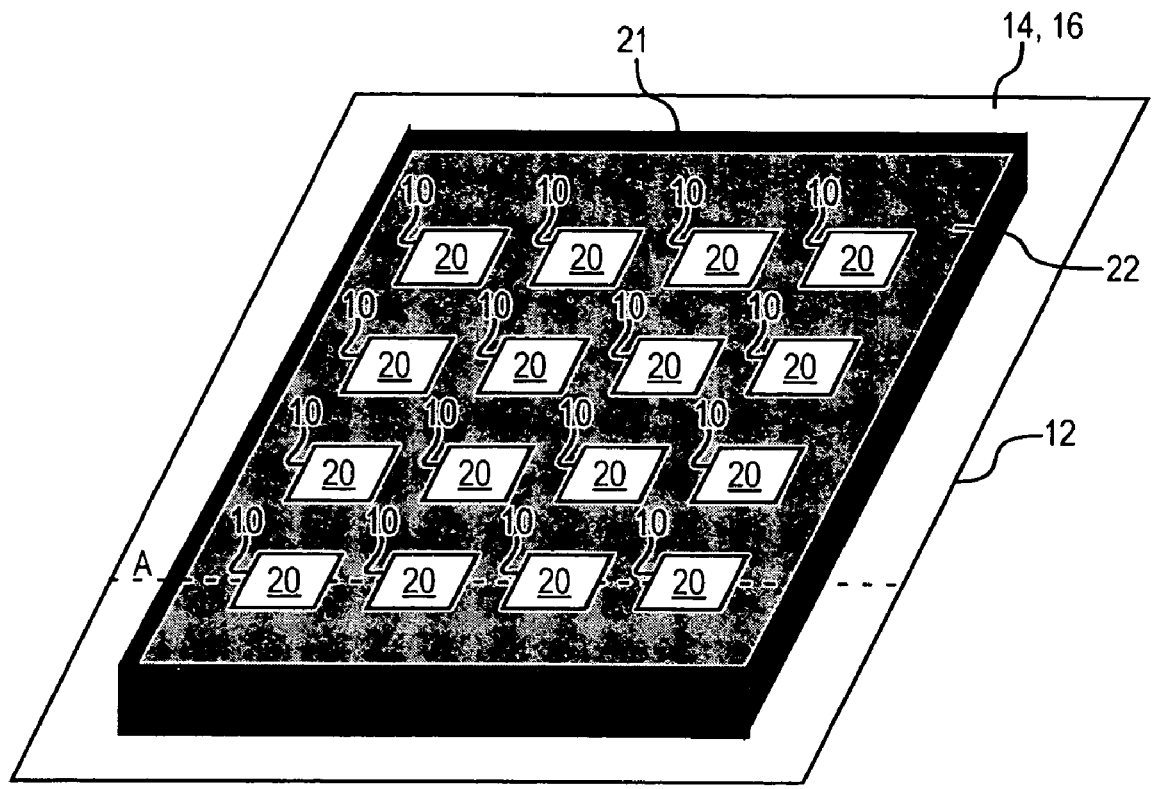
Figure 2D:
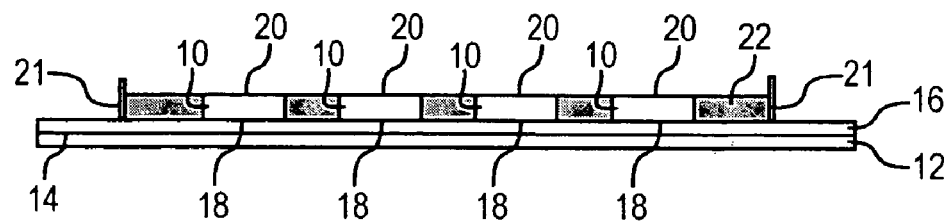

FIGS. 2C and 2D depict the formation of an encapsulated array. In general, FIGS. 2C and 2D are identical to FIGS. 2A and 2B, except that an encapsulant fluid 22 is dispensed on the tape 12 within the frame 21 to a level that coincides with the exposed surface 20 of the sliders 10. As depicted in FIG. 2D, the encapsulant fluid conforms to the sides of the sliders 10 as well as the profile of the upper surface 14 of the tape. In addition, no wicking of the encapsulant fluid 22 is shown between air-bearing surfaces 18 of the sliders 10 and the adhesive 16.

Figure 2E:
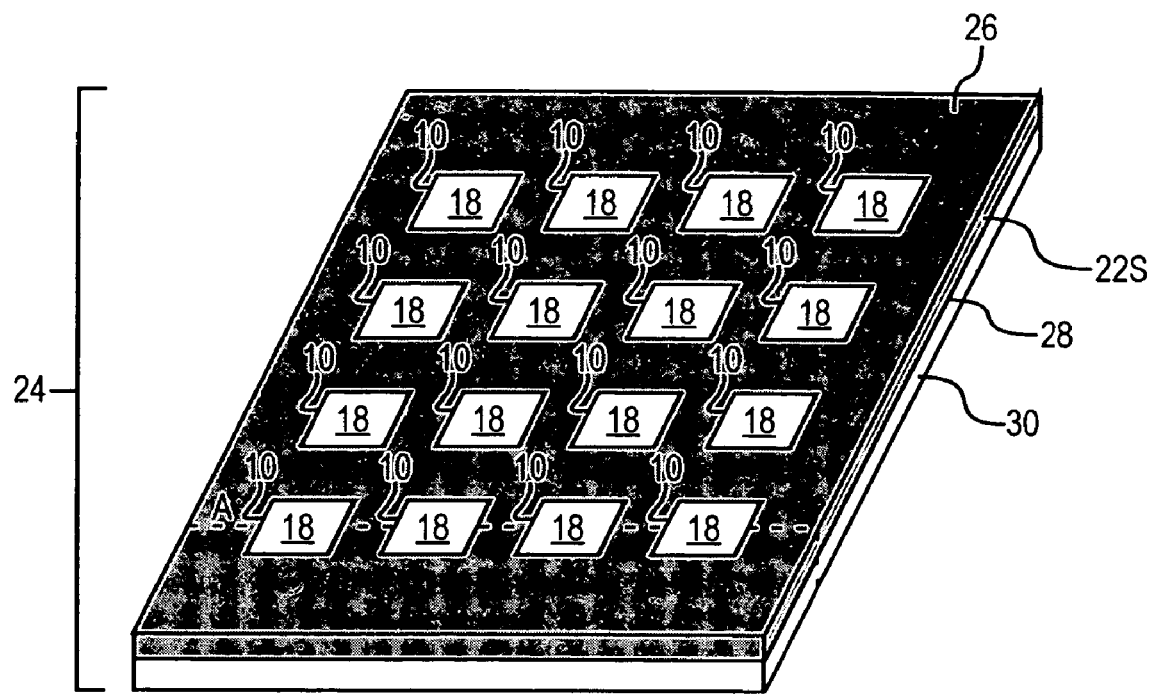
Figure 2F:
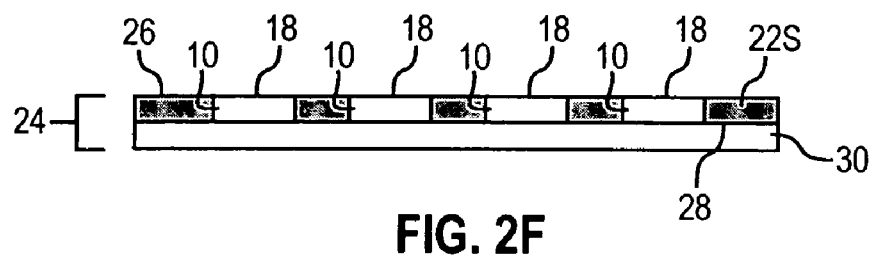

As depicted in FIGS. 2E and 2F, once the encapsulant fluid 22 solidifies to form the encapsulant 22S, the tape 12 may be removed to form the slider assembly 24. The slider assembly 24 has two opposing parallel planar surfaces indicated at 26 and 28. Surface 26 is formed in part by air-bearing surfaces 18 of the sliders 10, while surface 28 is formed in part by the back surfaces 20 of the sliders 10. A carrier 30 is attached to surface 28.

Method for Patterning an Air-Bearing Surface of a Slider

The invention further provides a method for patterning an air-bearing surface of a slider. The method involves applying a resist layer on an air-bearing surface of a slider, wherein at least a portion of the slider other than the air-bearing surface is encapsulated in a solid encapsulant comprising a polymer prepared by polymerizing a mixture of first and second monomers in a non-stoichiometric ratio effective to render the encapsulant debondable. A portion of the resist layer is removed to uncover a portion of the air-bearing surface in a patternwise manner. In some instances, material is added to the uncovered portion of the air-bearing surface. In addition or in the alternative, material may be removed from the uncovered portion of the air-bearing surface. As a result, the air-bearing surface is patterned. Notably, the encapsulant is mechanically stable upon exposure to any fluid employed to apply the resist layer, to remove the resist layer, to add material to the air-bearing surface and/or to remove material from the air-bearing surface.

In general, the resist layer may be applied using any of a number of conventional techniques, e.g., sequential spin coating, casting, extruding or the like. For example, a resist composition may be provided in a liquid solvent on the substrate surface, and heated to remove the solvent. As a result, the resist layer typically has a thickness of about 1 to about 20 micrometers, optionally about 2 to about 10 micrometers. To effect controlled removal of portions of the resist layer, it is preferred that the resist layer be applied with a uniform thickness.

To facilitate the patternwise removal of a portion of the resist layer, the resist layer may be comprised of a photosensitive composition that has been exposed to photons in the patternwise manner. Photosensitive compositions are typically polymeric and exhibit different removal properties after exposure to electromagnetic radiation. For example, photosensitive compositions may exhibit increased mechanical integrity resulting from radiation-initiated crosslinking or decreased mechanical integrity resulting from radiation-initiated breakdown. Examples of photosensitive compositions include, but are not limited to, positive and negative resists that are responsive to photon or electron beams. Positive photoresist compositions are more easily removed after exposure to radiation. Positive photoresists may include polymeric materials with weak links that degrade by the process of scission or contain a photoactive component that renders the composition more soluble to a solvent upon irradiation. Negative photoresist compositions, on the other hand, become more difficult to remove after exposure to radiation.

Suitable photosensitive compositions such as photoresists may comprise, for example, poly(methyl methacrylate) ("PMMA") or copolymers thereof such as poly(methyl methacrylate-co-t-butylmethacrylate), a poly(lactide) such as poly(lactide-co-glycolide), polymethacrylamide, polyoxymethylene, polyalkenesulfone, or poly(glycidylmethacrylate-co-ethyl acrylate), epoxies, phenolics, polymers thereof, copolymers thereof, and combinations thereof. Photosensitive compositions may also contain photoactive compounds including, but not limited to, diazonaphthoquinones, iodonium and sulfonium salts and o-nitrobenzyl esters.

Typically, the resist is irradiated using photonic radiation, e.g., ultraviolet radiation and a mask to provide the desired pattern. Following exposure, the resist layer may be developed using a suitable solvent to remove the irradiated or the non-irradiated areas to uncover a portion of each slider surface. One of ordinary skill in the art will recognize that there are many commercially available photoresists having different exposure wavelengths, and that custom photoresist compositions may be formulated to have a particular exposure wavelength.

When one wishes to add material to the uncovered portion of the air-bearing surface, various techniques are known in the art of semiconductor fabrication. Exemplary techniques include, but are not limited to, evaporation, sputtering, chemical vapor deposition, and electroplating. Notably, deposition techniques must be chosen according to the material. For example, metals may be deposited by evaporation, sputtering, electroplating, chemical vapor deposition, etc.

In order to effect a high degree of control over the addition of material to the air-bearing surface, vacuum deposition technology is generally preferred. Such vacuum processes include, but are not limited to, cathodic arc physical vapor deposition, electron-beam evaporation, enhanced arc physical vapor deposition, chemical vapor deposition, magnetronic sputtering, molecular beam epitaxy, combinations of such techniques and a variety of other techniques known to one of ordinary skill in the art.

When one wishes to remove material from the air-bearing surface, an etchant may be used to effect chemical, mechanical and/or physical removal material. In some instances, an isotropic etchant may be used to remove material in a direction-invariant manner such that no difference is exhibited in directional etching rate. Alternatively, an anisotropic etchant may be used to remove material preferentially in a particular direction, e.g., according to crystallographic orientation of the solid body or the direction of the light energy particles for light assisted etching. In some instances, an ionized gas such as argon-based or fluorine-based plasma or an ion beam may be used as an etchant. A liquid etchant may also be advantageously used as well.

Further information regarding patterning and etching processes using lithographic techniques is provided in Sze (1983), "Lithography," VSLI Technology, McGraw-Hill Book Company.

Thus, it should be apparent that encapsulant may be mechanically stable upon exposure to a variety of fluids employed to pattern the slider surface. For example, any fluids associated with the application, development, and/or removal of a resist layer. Such fluids may comprise of organic and/or inorganic compounds and may be acidic, basic, oxidizing, or reducing in nature. In addition, aqueous and/or nonaqueous fluids may be used as well.

FIG. 3 depicts an example of the above-described method for patterning an air-bearing surface of a plurality of sliders provided in the form of the slider assembly depicted in FIG. 2. As shown in FIG. 3A, the slider assembly 24 is placed on a flat surface such that the air-bearing surface 28 of the assembly faces upward and the carrier 30 contacts the flat surface. A photoresist layer 32 is applied in a uniform thickness over the air-bearing surface. Due to the planarization of air-bearing surface 28, the resist layer may be applied as a thin, high-resolution coating. Planarized surfaces have been coated with resist layers having a preferred thickness of about 1 to 25 micrometers and a more preferred thickness of about 2.0 to 15 micrometers. This provides a resolution of about 200 micrometers to 5 micrometers.

Figure 3A:
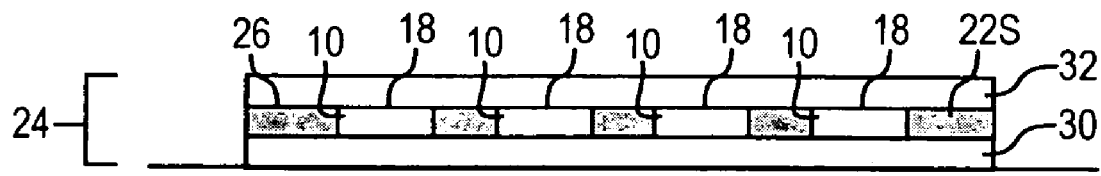
FIGS. 3A–3E, collectively referred to as FIG. 3, depict an example of a method for photolithographically patterning an air-bearing surface of a plurality of sliders provided in the form of the slider assembly depicted in FIG. 2.
Figure 3B:
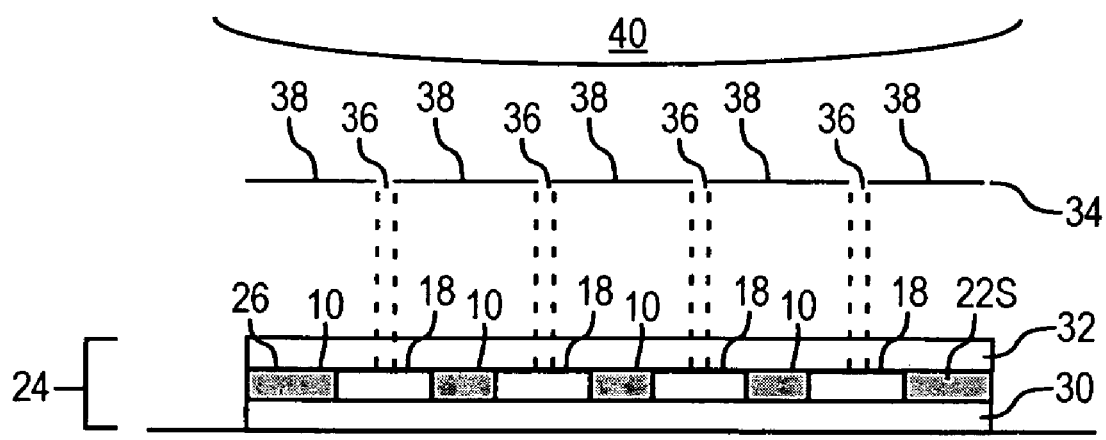

FIG. 3B depicts the patternwise exposure of the photoresist layer 32 to photons. This is performed by providing a mask 34 having transparent regions 36 and opaque regions 38. A source 40 of photons is provided in order to generate radiation, preferably substantially collimated, having a wavelength to which the photoresist layer 32 is responsive. Typically, the wavelength is an ultraviolet wavelength. The mask 34 is placed between the photon source 40 and the photoresist layer 32 such that the transparent regions 36 are in alignment with the air-bearing surfaces 18 of the sliders 10. As a result, radiation is transmitted through the transparent regions 36 of the mask 34, and the photoresist layer is converted into a patterned layer comprising the exposed and the unexposed regions. In some instances, grayscale masks are employed.

Figure 3C:
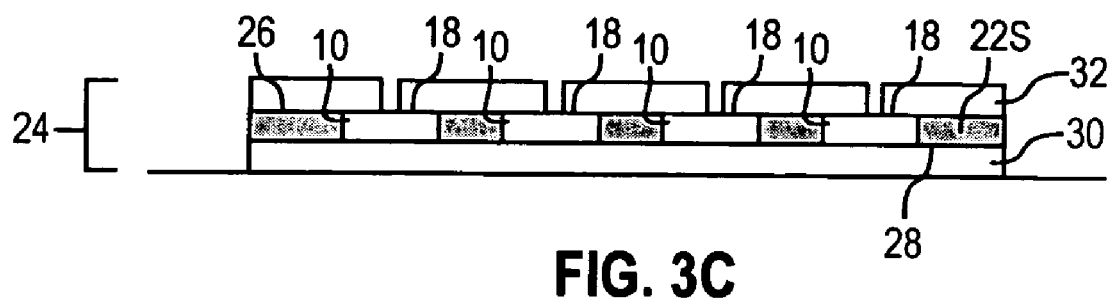

FIG. 3C depicts the removal of a resist layer according to the pattern formed in FIG. 3B. This is achieved by developing the exposed portions of the photoresist layer 32 to facilitate removal thereof. In this case, the exposed portions are washed away with a solvent, leaving the unexposed portions intact. As a result, portions of the air-bearing surfaces 18 are uncovered.

Figure 3D:
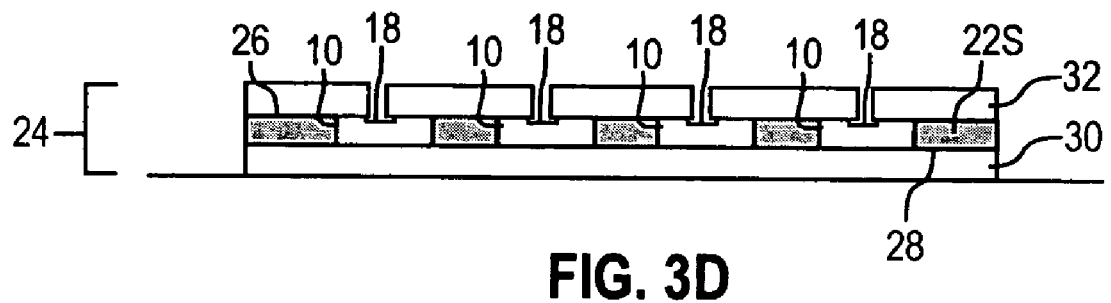
Figure 3E:
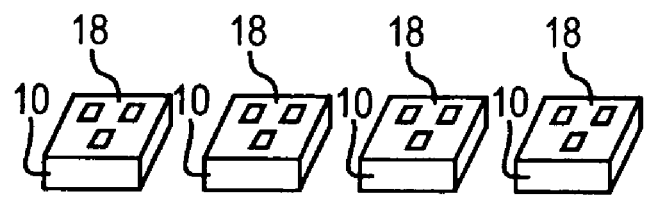

FIG. 3D depicts the removal of material from the uncovered slider surfaces 18 by exposing the surfaces 18 to an etchant. By debonding the encapsulant 22S from the sliders, as depicted in FIG. 3E, encapsulant free sliders 10, having patterned air-bearing surfaces 18, are formed. As discussed above, debonding may involve using a solvent to wash away the encapsulant or applying heat to liquefy, vaporize, and/or discompose the encapsulant. Mechanical action may also be used sparingly to assist in the debonding process. For example, soft brushes may be used in conjunction with a solvent to remove encapsulant from the sliders so that no residue is left behind.

Encapsulant Fluids and Debondable Encapsulants

The selection of encapsulant fluids and debondable encapsulants represents a particularly important aspect of the invention. As discussed above, the encapsulant fluids are selected for their ability to gap-fill and to form slider arrays having high planarization values. However, encapsulant fluids having a desirable gap-filling capability tend to form encapsulants having poor debonding performance. Thus, while a number of encapsulant materials have been investigated, only a relative few have been found to exhibit both excellent gap-filling capabilities and bonding/debonding performance.

For example, a number of thermosetting materials satisfy certain processing and solvent resistance requirements of the invention. Epoxies having acceptable gap-filling capabilities and suitable for semiconductor packaging applications may be adapted for use in conjunction with the invention. These epoxies are commercially available from a number of sources, e.g., under the trademark Epotek® from Epoxy Technology (Billerica, Mass.). Nevertheless, commercial thermosetting materials are typically formulated to form permanent rather than temporary bonds. As a result, when used in conjunction with the present invention, encapsulants formed from such thermosetting materials are not easily removable and unsuited for the invention.

It has also been observed that thermoplastics, as a general class of materials, are readily removed from sliders of slider assemblies. However, encapsulant fluids containing thermoplastics typically include a solvent to lower the viscosity of the thermoplastic to a degree sufficient to effect gap filling. Thus, thermoplastic systems typically exhibit several distinct disadvantages. For example, encapsulant fluids can only be applied in a manner that allows the solvent to evaporate without leave voids or other inhomogeneities. In addition, encapsulants formed from thermoplastics typically do not possess the requisite resistance to fluids employed for lithographic patterning of an air-bearing surface of a slider.

Thus, the invention optional provides an encapsulant that has both a thermoplastic polymer as well as a thermoset polymer, thereby meeting the need for a material that can be deposited in liquid form without the assistance of a solvent. When a solventless encapsulant is formed, solvent which does not take part in the polymerization reaction is absent from the components utilized to make the polymeric encapsulant. Accordingly, upon mixing the various components, e.g., the components that contain the first and optional second monomers, there is generally no solvent to be evaporated or entrapped into the resulting thermosetting polymeric materials. In other words, the whole system may be 100% active, and no waste may occur as a result through solvent evaporation. Under such solventless conditions, encapsulants formed are generally void free, since there are no solvent losses through evaporation or solvent entrapments to cause porosity and blistering. As an added benefit, the absence of solvents eliminates environmental pollution caused by solvent loss.

The inventive encapsulants may be formed through a polymerization mechanism that involves the reaction of the first constituent, generally, but not necessarily through addition polymerixation without the formation of any volatile by-products which could cause voids, blisters or entrapments. In some instances, these polymers can include ladder-like type polymers wherein the components are cross-linked spacially in the form of a ladder. For example, two linear parallel polymeric chains are intersected at their repeated reaction sites by components which form the steps of the spacial ladder. To effect desired curing, heat may be required, e.g., to a temperature of about 60° C. to about 150° C., or more typically, of about about 80° C. to about 120° C. from for about 1.5 hours. Heating time may be shortened at higher curing temperatures. The desired shelf-life for the inventive encapsulant fluid is at least about 30 minutes, preferably at least about an hour. That is, the first constituent preferably has a low viscosity at room temperature for at least the duration of the desired shelflife.

In some instances, the first encapsulant polymer may be formed from an amine and an acrylate or epoxide group. For example, an amine-containing monomer may comprise mono, di, tri, tetra or poly amines, amine-terminated structures or an adduct of mono, di, tri, or polyamines. The additional monomer may comprise mono, di or polyacrylates, mixtures of mono, di or polyacrylates, or a mixture of mono, di or poly acrylates and mono, di or polyfunctional epoxides and/or glycidyl esters of acrylic acid or methacrylic acid.

Examplary mono amines include ethanol amine, 2 ethylhexyl amine, nonyl amine, hexadecyl amine, and octadecyl amine. Useful diamines include, but are not limited to, hydrazine, ethylene diamine, 1,4-butylene diamine, 1,6-hexamethylene diamine, 1,2-cyclohexamethylene diamine. Tri (or poly)amines suitable for the invention include, without limitation, diethylene triamine, dipropylene triamine, triethylene tetramine, tetraethylene pentamine, and bis hexamethylene triamine.

Mono, di or poly functional acrylates useful in this invention include, for example, those having aliphatic, cycloaliphatic, or aromatic structures and their combinations. Illustrative examples of mono functional acrylics are: acrylonitrile, methyl acrylonitrile, acrylamide, methyl acrylamide, N-methylol acrylamide, N-methylol methyl acrylamide, N,N' dimethylol acrylamide, N,N' dimethylol methyl acrylamide, diacetone acrylamide, diacetone methyl acrylamide, hydroxyl ethyl acrylate, hydroxyl propyl acrylate.

Illustrative examples of difunctional acrylates are the diacrylates and dimethyl acrylates of 1,4 butylene diol, neopentyl glycol, oxodiethylene glycol, oxotriethylene glycol, oxotetraethylene glycol, and oxo polyethyleneglycols. Illustrative examples of tri (or poly) functional acrylates include, without limitation triesters of acrylic acid, or methyl acrylic acid, with trimethylol ethane, trimethylol propane, and pentaerythritol.

Illustrative examples of mono, di or poly functional epoxides include ethylene oxide, propylene oxide, butylene oxide, and styrene oxides.

In instances that involve in situ polymerization via reaction of a plurality of moieties, e.g., from amines and epoxides, the moieties are typically present in a stoichiometric ratio. Alternatively, nonstoichometric ratios may be involved. In particular, commercially available thermosetting resins under the trademark Epotek® from Epoxy Technology (Billerica, Mass.) may be used to yield a transparent material, which had a prepolymerization a viscosity similar to that of water. Once subjected to a temperature of 90° C. over a 1.5 hour period, the low viscosity monomer mixture may exhibit a desired dimensional stability, and solvent resistance. Moreover, the polymer formed may be readily removed by the appropriate solvent choice, e.g., propylene glycol methyl ether acetate and N-methylpyrrolidinone.

In addition, the first polymer may be formed from moieties other than epoxides and amines. Acrylates and/or carboxylic acids, and anhydrides may be used as well. Exemplary reactions adaptable for use with the invention are known in the art and are described in U.S. Pat. No. 4,051, 195 to McWhorter, U.S. Pat. No. 4,675,374 Nichols, and U.S. Pat. No. 4,742,147 to Nichols.

As discussed above, the second consitutent may be comprised of a second polymer or a second monomer suitable for polymerication to form the second polymer, as long as the second polymer is different from the first. Thus, for example, when the first polymer is formed from an epoxide and an amine, the second polymer is typically not formed from an epoxide and an amine. Nevertheless, the second polymer may be formed from an epoxide and amine combination that is different from the epoxide and combination for the first polymer. In such a case, the first and second constituents of the encapsulant fluid may not substantially react with reach other.

When the second constituent is comprised of a second monomer suitable for in situ polymerization, the first and second polymers may be polymerized via different mechanisms. For example, the first polymer may be polymerized via condensation, e.g., reaction between an amine and an epoxide, and the second polymer may be polymerized via addition, e.g., addition polymerization of an acrylate.

In addition, different types of polymeric structures may be employed, for the first and the second polymer. For example, the first polymer may be comprised of a linear polymer, a branch polymer, or a network polymer. The second polymer may be comprised of a linear polymer. In some instances, the first and second polymers may form an interpenetrating network. Depending on the microstructure of the encapsulant, e.g., crystallinity, crystal size, etc., the encapsulant may be transparent.

It should be noted that the bonding and debonding performance of an encapsulant is dependent on a variety of factors and is not generally predictable solely based on the presence of a plurality of different polymers or the presence of a polymer that is formed in situ. Thus, for example, while the presence of certain polymers formed in situ may allow the encapsulant to exhibit acceptable bonding and debonding performance, other polymers formed in situ may not. Thus, when a class of polymers is generally identified as exhibiting acceptable bonding/debonding performance, specific polymers within that class which suffer from poor bonding and/or debonding performance is specifically excluded by the invention.

It has been experimentally verified that an encapsulant may be formed via concurrent polymerization of a linear polymer (from liquid monomeric acrylates and a dissolved free radical initiator that decomposes at about 60° C. to 70° C.) and a thermosetting polymer (from diepoxide with a stoichiometric quantity of tetraamine). The ingredients formed a homogeneous mixture in the same "pot." Once heated to 90° C. for 1.5 hours, homogeneous transparent encapsulant was formed with excellent step heights, solvent resistance to lithographic steps, and debondability.

It is to be understood that while the invention has been described in conjunction with the preferred specific embodiments thereof, the foregoing description is intended to illustrate and not limit the scope of the invention. Other aspects, advantages and modifications will be apparent to those skilled in the art to which the invention pertains.

All patents and publications cited herein are incorporated by reference in their entireties.

We claim:

1. A slider assembly comprising a plurality of sliders bonded by a solid debondable encapsulant comprising different first and second polymers such that each slider has an encapsulant-free surface, the encapsulant-free surfaces are coplanar to each other, and the encapsulant is formed via in situ polymerization of an encapsulant fluid, wherein
the encapsulant fluid is comprised of a homogeneous mixture of first and second constituents,
the first constituent is comprised of a first monomer suitable for in situ polymerization to form the first polymer,
the second constituent is comprised of the second polymer or a second monomer suitable for in situ polymerization to form the second polymer, and
the first constituent does not substantially react with the second constituent.

2. The slider assembly of claim 1, wherein the first constituent is comprised of an amine and an epoxide.

3. The slider assembly of claim 2, wherein the epoxide is a diepoxide.

4. The slider assembly of claim 2, wherein the amine is a tetraamine.

5. The slider assembly of claim 2, wherein the amine and the epoxide are present in a stoichiometric ratio.

6. The slider assembly of claim 1, wherein the first monomer is comprised of an acrylate.

7. The slider assembly of claim 1, wherein the first polymer is a thermosetting polymer and the second polymer is a thermoplastic polymer.

8. The slider assembly of claim 1, wherein the second constituent is comprised of the second monomer suitable for in situ polymerization.

9. The slider assembly of claim 8, wherein the first and second polymers are polymerized via different mechanisms.

10. The slider assembly of claim 9, wherein the first polymer is polymerized via condensation and the second polymer is polymerized via addition.

11. The slider assembly of claim 10, wherein the first constituent is comprised of an amine and an epoxide and the second constituent is comprised of an acrylate.

12. The slider assembly of claim 1, wherein the first polymer is comprised of a linear polymer.

13. The slider assembly of claim 1, wherein the first polymer is comprised of a branch polymer.

14. The slider assembly of claim 1, wherein the first polymer is comprised of a network polymer.

15. The slider assembly of claim 13, wherein the second polymer is comprised of a linear polymer.

16. The slider assembly of claim 14, wherein the second polymer is comprised of a linear polymer.

17. The slider assembly of claim 1, wherein the encapsulant is transparent.

18. The slider assembly of claim 1, having a contiguous planar surface comprised of at least one encapsulant region and containing the coplanar slider surfaces.

19. The slider assembly of claim 18, wherein the sliders are arranged in an array.

20. The slider assembly of claim 19, wherein the array is a rectilinear array.

21. The slider assembly of claim 20, wherein the sliders do not contact each other.

22. The slider assembly of claim 20, wherein the coplanar surfaces of the sliders are each an air-bearing surface.

23. The slider assembly of claim 22, further comprising a substrate in contact with the air-bearing surfaces.

24. The slider assembly of claim 23, wherein the substrate is comprised of a laminate of a flexible tape and an adhesive, wherein the adhesive is in contact with the air-bearing surfaces.

25. The slider assembly of claim 24, wherein the adhesive is a pressure sensitive adhesive.

26. The slider assembly of claim 24, wherein the adhesive preferentially adheres to the tape over the air-bearing surfaces.

27. The slider assembly of claim 20, further comprising a carrier attached to the encapsulant, at least one slider, or both, wherein the carrier does not cover any of the coplanar slider surfaces.

28. The slider assembly of claim 22, further comprising a resist layer on the air-bearing surfaces, wherein the encapsulant is mechanically stable upon exposure to the resist layer or any component thereof.

29. The slider assembly of claim 28, wherein the encapsulant is subject to solvation by a solvent not found in the resist layer.

30. A method for forming a slider assembly, comprising:
 (a) arranging a plurality of sliders each having a surface such that the surfaces are coplanar to each other;
 (b) dispensing an encapsulant fluid to bond the sliders without contacting the coplanar slider surfaces, wherein
  the encapsulant fluid is comprised of a homogeneous mixture of first and second constituents,
  the first constituent is comprised of a first monomer suitable for in situ polymerization to form a first polymer,
  the second constituent is comprised of a second polymer that is different from the first polymer or a second monomer suitable for in situ polymerization to form the second polymer, and
  the first constituent does not substantially react with the second constituent; and
 (c) effecting in situ polymerization of the encapsulant fluid so as to form a solid debondable polymeric encapsulant comprised of the first and second polymers.

31. The method of claim 30, wherein the second constituent is comprised of the second monomer suitable for in situ polymerization.

32. The method of claim 31, wherein step the first and second monomers are simultaneously polymerized in situ during step (c).

33. The method of claim 30, wherein step (c) is carried out in a temperature range of about 60° C. to about 150° C.

34. The method of claim 33, wherein step (c) is carried out in a temperature range of about 80° C. to about 120° C.

35. The method of claim 30, wherein the encapsulant fluid dispensed in step (b) does not contain any solvent.

36. The method of claim 30, wherein step (a) comprises placing the sliders on a laminate of a flexible tape and an adhesive such that slider surfaces contact the adhesive.

37. The method of claim 36, wherein the adhesive is resistant or impervious to solvation by the encapsulant fluid.

38. The method of claim 30, wherein the fluid mixture has an initial viscosity of no more than about 800 centistokes.

39. The method of claim 30, wherein the initial viscosity is no more than about 500 centistokes.

40. A method for patterning an air-bearing surface of a slider, comprising:
 (a) applying a resist layer on an air-bearing surface of a slider, wherein at least a portion of the slider other than the air-bearing surface is encapsulated in a debondable solid encapsulant comprised of different first and second polymers formed via in situ polymerization of an encapsulant fluid, wherein
  the encapsulant fluid is comprised of a homogeneous mixture of first and second constituents,
  the first constituent is comprised of a first monomer suitable for in situ polymerization to form the first polymer,
  the second constituent is comprised of the second polymer or a second monomer suitable for in situ polymerization to form the second polymer, and
  the first constituent does not substantially react with the second constituent;
 (b) removing a portion of the resist layer to uncover a portion of the air-bearing surface in a patternwise manner; and
 (c) adding material to and/or removing material from the uncovered portion of the air-bearing surface, thereby patterning the air-bearing surface of the slider,
 wherein the encapsulant is mechanically stable upon exposure to any fluid employed in steps (a), (b), and/or (c).

41. The method of claim 40, further comprising, after step (a) and before step (b), exposing the resist layer to photons in the patternwise manner.

* * * * *